United States Patent

Carlsen et al.

[15] 3,676,646

[45] July 11, 1972

[54] DOCUMENT WITH CHEMICALLY DEVELOPABLE PRECISELY DEFINED ALPHANUMERIC CHARACTERS

[72] Inventors: Donald W. Carlsen, Princeton Junction; John J. Kotla, Cranbury; Arden A. Parker, Hightstown, all of N.J.

[73] Assignee: International Business Machines Corporation, Armonk, N.Y.

[22] Filed: Aug. 31, 1970

[21] Appl. No.: 68,273

[52] U.S. Cl. ....................235/61.12 N, 101/426, 260/33.4 R, 283/8 R

[51] Int. Cl. ................B41m 3/14, G06k 19/06, C08f 45/66, B42d 15/00

[58] Field of Search.................101/DIG. 1, 426; 35/9 R, 9 A, 35/9 D, 9 E; 283/6, 8 R, 8 A–8 B; 235/61.12 N, 61.12 R; 260/33.4 R; 106/21

[56] References Cited

UNITED STATES PATENTS

| | | | |
|---|---|---|---|
| 2,963,220 | 12/1960 | Kosten | 235/61.12 N |
| 3,485,168 | 12/1969 | Martinson | 101/426 |
| 3,527,927 | 9/1970 | Bijleveld | 235/61.12 N |
| 3,438,927 | 4/1969 | Ehrlich | 260/33.4 |
| 1,884,197 | 10/1932 | Peterson | 283/8 X |
| 3,088,841 | 5/1963 | Guertin | 283/8 R |
| 3,031,961 | 5/1962 | Czeropski | 101/426 |
| 1,732,223 | 10/1929 | Conard | 283/8 R |
| 3,011,905 | 12/1961 | Newman | 101/DIG. 1 |

*Primary Examiner*—Maynard R. Wilbur
*Assistant Examiner*—Robert M. Kilgore
*Attorney*—Hanifin and Jancin and Henry E. Otto, Jr.

[57] ABSTRACT

A document processable in optical alphanumeric character readers has a plurality of identical constraint character patterns printed on an untreated substrate in an improved moisture-setting or lithographic ink that is visible to the human eye as a hand printing guide to the operator but not machine-recognizable until selectable portions of the pattern are developed by a developing solution applied by a pen to create a desired one of a plurality of alphanumeric characters of an intensity recognizable by such a machine. The discontinuous pattern configuration assures sharply defined distinctive machine-recognizable characters without undesirable feathered edges or "tics." The highly reflective developer provides no machine-recognizable image when inadvertently applied to uninked areas of the substrate.

16 Claims, 4 Drawing Figures

Figure 1:
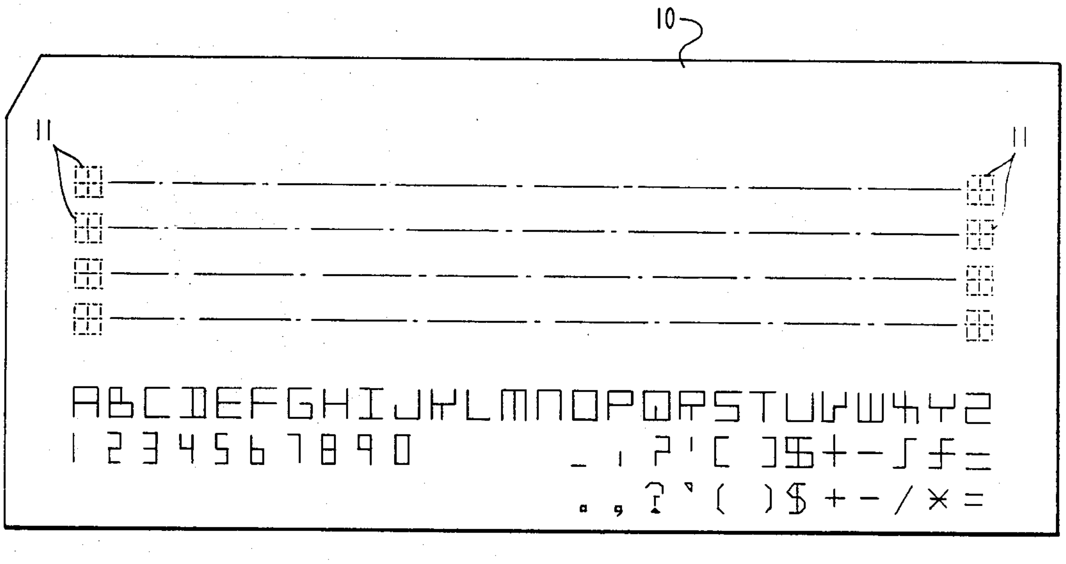

INVENTOR
DONALD W. CARLSEN
JOHN J. KOTLA
ARDEN A. PARKER
BY Henry E. Otto Jr.
ATTORNEY

DOCUMENT WITH CHEMICALLY DEVELOPABLE PRECISELY DEFINED ALPHANUMERIC CHARACTERS

This invention relates to a hand printable source document which is capable of being machine processed in an optical alphanumeric character reader, and and to a method of creating on such a document selectable alphanumeric characters which are sharply defined and of a color, intensity and consistency necessary for recognition in an optical alphanumeric character reader.

BACKGROUND OF THE INVENTION

Due to variations in handwriting skills, it is extremely difficult, if not impossible, to assure that handwritten data is sufficiently consistent in format, sharp in definition, and precise in location for reliable reading by a machine which identifies characters by integrating and interpreting the intensity of blackness in a plurality of optically scanned areas. Attempts have been made in the past to provide some constraints so that a document can be handprinted readily in certain areas but not in others, thereby to provide a hand printable source document which can be machine processed in an optical alphanumeric character reader without need for keypunching or other prior preparation.

One approach proposes that a substrate having a plurality of identical rectangular figure-8 shaped writing tracks be surrounded by specially coated areas to discourage adherence of printing ink or pencil marks anywhere except in the tracks. While this and the other variations tend to discourage the adhesion of a mark except in the writing tracks, they do not prevent such a mark. Any pencil lead or ink that is unintentionally applied to the varnished or other coated area can bead or smear into the track or rub off readily and undesirably foul the feed rollers or other mechanism in the machine. Apparently to minimize this possibility it is intended that the writer be compelled to draw the figures rather than just write them fluently; presumably this means that the track in which the mark is placed is wider than the stroke width of the writing instrument, requiring the writer to condition himself to fill it in fully by several applications of the writing instrument to the same track. This would involve additional time and a high degree of care on the part of the writer. Moreover, the intensity of the drawn figure could vary considerably depending upon the number of reapplications and the pressure applied to the instrument. Writing tracks formed in relief or by embossment, as also proposed, could also create problems in sorting, transport, and erasure of an erroneous character.

Another approach purports to overcome some of these deficiencies by proposing a printed constraint character pattern which is chemically developed in selected areas by a pen applied developing solution to provide a selectable one of a plurality of characters recognizable by an optical character reading machine. The patented method involves the steps of printing visible ink border lines on a work sheet to outline a series of rectangular areas, then subsequently printing an invisible ink prefiguration within these visible bordered areas with a colorless reactant that forms a human- and machine- readable character by reaction with the operator-applied developing solution.

There are several problems with this approach. First, it is difficult to obtain accurate registration during the successive printing steps to assure that the reactant will be applied precisely within the confines of the previously printed visible border lines of the constraint character; and misregistration may impair reliable readability by the machine. Furthermore, manufacture in two separate printing stages is expensive. Moreover, the constraint pattern disclosed has treated rectangular areas which touch adjacent treated rectangular areas, resulting in undesirable feathering or "tics" in the developed image.

Finally, for reasons explained below, the combination of the "ink" and the developing solutions proposed for this approach to treat and then develop the outlined area were found by actual test to be unsatisfactory for use in an optical character reader operating within the infrared range where constraint patterns would be used.

Optical alphanumeric character reading machines are of two general types: (a) "visible readers" that read within a preselected band (e.g., about 450 to 550 mu) within the human visible range and use curve followers and cathode ray tubes to recognize and hence "read" free drawn handwritten characters; and (b) "infrared readers" that read within a preselected band (e.g., about 850 to 950 mu) within the infrared range and which do not employ such expensive equipment but use scanning techniques that require sharp character definition of the type which selectively developable constraint patterns seek to achieve.

In actual tests, it was found that the "ink" proposed for use with this approach was actually too fluid to be printable with conventional printing equipment (i.e., wet offset, dry offset and gravure). When such ink was wiped onto 0.007 inch thick cardstock and on paperstock and developed by the developing solutions proposed, the "ink" actually impregnated the cardstock and paperstock to such an extent that developer applied to the opposite side would produce a darkened image. Also, the developed images actually obtained were not dark enough to be reliably machine readable in the infrared range because they produced 50–70 percent reflectance relative to the background as read on a spectrophotometer used in a reflectance mode (whereas the maximum should be about 40 percent and 30 percent or less is preferred). Moreover, the developing solution impregnated through the cardstock and paperstock, and stained and darkened the back side as well as the front side of the cardstock.

For these and other reasons, the documents and marking techniques taught by the prior art, such as exemplified by these examples, are not suitable in practice.

SUMMARY OF THE INVENTION

Applicants have discovered that problems of the type above described can be overcome by providing a document comprising a plurality of identical constraint patterns of a unique "tic" precluding configuration printed in a single printing operation on an untreated substrate in an improved ink of the type hereinafter described which is visible to the human eye but not machine readable until chemically developed. Data is entered on this document by chemically developing selected portions of the inked symbol by a pen containing an improved developing solution of the type hereinafter described that creates precise machine-recognizable alphanumeric characters having a color and a consistency of intensity and location which assure they can reliably be machine read by an optical alphanumeric character reader.

Figure 2:
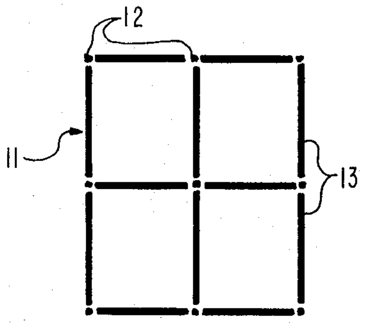
Figure 4:
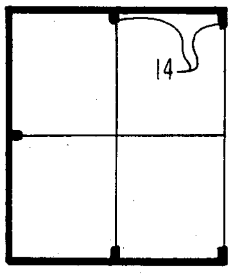
Figure 3:
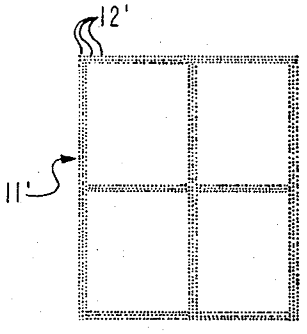

Other objects and advantages will become more apparent from the following more detailed description of the invention and from the accompanying drawing, wherein:

FIG. 1 is a plan view of a document embodying the invention, showing a plurality of identical ink printed guide symbols all except a few of which have been selectively developed to provide a complete set of alphanumeric characters;

FIGS. 2 and 3 are plan views to enlarged scale of the ink printed symbol of FIG. 1 and of a modification thereof which may be selectively developed to provide alphanumeric characters; and FIG. 4 is a plan view to enlarged scale of an ink printed symbol which will produce undesirable "tics" at the intersections of the symbol-defining lines and which "tics" are essentially prevented by use of the configurations of FIGS. 2 and 3.

DESCRIPTION

As shown in FIG. 1, the document embodying the invention comprises a substrate 10 of cardstock, paper, polyester, or other material on which a plurality of rows of identical symbols 11 are printed in a single printing step in an improved ink (hereinafter to be described) that is visible to the human eye but not to an optical alphanumeric character reading machine wherein characters are recognized by optical scanning techniques. As illustrated, each symbol 11 is in the form of a hollow square divided into four hollow subsquares of equal size, preferably by a series of dots 12 and dashes 13 combined to provide broken lines of equal width, as best shown in FIG. 2. This constraint character pattern of broken lines serves as a guide for an operator to trace over with a pen (not shown) containing an improved developing solution (hereinafter to be described) that chemically develops selectable portions of the pattern to create any desired one of the alphanumeric characters of the type shown in FIG. 1.

The chemical reaction of the developing solution with the inked constraint character pattern produces a precisely defined and positioned character of a color and intensity and consistency which is readable by the optical reading machine and also clearly distinguishable from the basic ink-printed symbol so the operator can readily observe the character he has created. The stroke width of the pen tip is at least equal to, but preferably slightly greater than, the width of the respective broken lines defined by the dots and dashes 12,13 to assure that a full width line will be developed with a single stroke of the pen. The developing solution hereinafter described provides no machine recognizable image if and when applied to uninked areas of the substrate; however, this requirement is not essential if the document is to be employed in an optical character reading machine which is gated, masked or otherwise conditioned to recognize only images that are formed by lines of the inked constraint pattern.

The ink selected for printing the pattern is preferably one comprising a phenol whose reaction product with iron salts is black, and a compound which when combined with the phenol in requisite quantity provides an ink that is substantially neutral to cause at least two protonic hydrogen ions to be removed from the phenol and generate highly reactive phenoxide ions to be available for reaction upon application of a developing solution comprising an iron salt dissolved in a polar solvent in the presence of halide and acetate ions. Moisture-setting inks and lithographic inks meeting this definition provide human and machine readable characters immediately when developed with the aforementioned developing solution due to the reaction-accelerating effect of the acetate ions.

In moisture-setting inks, the resin content of which has a relatively high acid number (of the order of about 250 to 350), the aforementioned compound preferably is an amine, a 1 percent solution of which in water would give a pH value of at least 9; and the ratio, by weight, of phenol to amine should not exceed 2:1 and may be as little as 5:1.

In lithographic inks, the resins are inherently of low acid number (of the order of about 10 to 25) and do not substantially alter the essentially neutral nature of the ink. It has therefore been found that an amine is unnecessary because the resin, when combined with the phenol in the quantities specified herein, serves as the compound above referred to in that it provides an ink which is substantially neutral, thereby making the protonic hydrogen ions available for reaction.

Moisture-setting inks are generally applied to cardstock; whereas lithographic inks are generally used for printing on paper. The following are specific examples of formulations for a moisture-setting ink and a lithographic ink that have been successfully printed and developed in accordance with the invention:

EXAMPLE 1

Moisture-setting Ink

| Percent Weight | Material |
|---|---|
| 1.0 | Bonadur red pigment 20–6440 of American Cyanamid (coupling product of 6-amino-4-chloro-m-toluene sulfonic acid with 3-hydroxy-2-naphthoic acid) |
| 35.0 | Tenox PG of Eastman Chemical Co. (propyl gallate) |
| 8.0 | Tetradecyl amine or stearyl amine |
| 43.0 | 60% FCD–16 in triethylene glycol |
| 3.0 | Talolin of Tiona Oil Co. (proprietary lubricating grease) |
| 3.0 | Alumina hydrate |
| 5.0 | Diethylene glycol |
| 2.0 | Atpet–100 of Atlas Chemical Co. (sorbitan partial fatty ester) |
| 100.0 | |

FCD–16 is a proprietary modified condensate resin of maleic acid of France, Campbell & Darling Co., which is dissolved in triethylene glycol and sold by Superior Varnish Co. The FCD–16 resin is described in the manufacturer's trade literature as having an acid value of 290–320, a melting point as determined by the mercury method of 157°–163° C., a specific gravity of 1.10, soluble in glycols, insoluble in aliphatics, and having a poor tolerance for mineral spirits. The particular pigment should be selected according to the wavelength of the optical scanner in which the document is to be read; in the above example, Bonadur red pigment is used for a document to be read in an infrared scanner.

EXAMPLE 2

Lithographic Ink

| Percent Weight | Material |
|---|---|
| 55.0 | 100–S varnish of Lawter Chemical Co. |
| 2.0 | Alvco 404 gloss varnish of Lawter Chemical Co. |
| 40.0 | Tenox PG of Eastman Chemical Co. (propyl gallate) |
| 3.0 | Bonadur red pigment 20–6440 (see above note) |
| 100.0 | |

The two varnishes provide low acid-number resins that serve as the compound that provides the requisite neutrality to make at least two protonic hydrogen ions available for reaction, as more fully described above.

The following phenolic compounds have also been found by actual test to react with iron compounds to generate a black color and may be substituted in like amount by weight for the propyl gallate in either Example 1 or Example 2:

a. Trihydroxybutyrophenone (THBP of Eastman Chemical Co.);
b. Sodium salicylate in combination with 2,3 dihydroxynaphthalene-6-sulfonic acid, sodium salt;
c. 8-hydroxyquinoline;
d. 2,4 dihydroxybenzophenone.

The following is an example of a developing solution formulation that has been used successfully to develop the inks of Examples 1 and 2 to create machine readable characters of desired consistency of color, intensity, width and location:

EXAMPLE 3

Organic Developer Formulation

| Percent Weight | Material |
|---|---|
| 20.0 | Ferric chloride hexahydrate |
| 20.0 | 1-butanol |

| | |
|---|---|
| 36.0 | Diethylene glycol |
| 20.0 | Tetraethylene glycol |
| 4.0 | Ammonium acetate |
| 100.0 | |

This formulation provides a rapidly developed, dense character and is non-corrosive to the metal machine parts it may contact during processing; however, it produces a light yellow color, which is not machine recognizable, if applied to any uninked areas of the substrate. While the effect of the ammonium acetate is not fully understood, it appears to act as a reaction-accelerating catalyst. The ratio by weight of reactant (ferric chloride hexahydrate) to ammonium acetate should be about 5:1 as a maximum and 10:1 as a minimum.

It should be noted that these inks and the developing solution therefor may be applied to untreated substrates; i.e., they do not require any special background substrate coating or formulation to produce the reactions above described. Since only those portions of the symbols that are intended to be developable are printed with the ink formulation, registration problems are eliminated and manufacturing cost is desirably minimized; it is unnecessary to coat, varnish or wax the areas where machine recognizable images are not desired, and the constraint pattern is printed in an ink that is visible to the human eye (rather than in an invisible ink printed in a prescribed border outline). Intensity of image is essentially uniform, since it is independent of writing pressure or number of reapplications of pen or pencil to the writing track.

If the operator errs and unintentionally develops an undesired portion of the symbol, that portion may be rendered nonreadable by the machine by application of a correction or eradicator fluid comprising a solution of phosphoric acid in water. The following is an example of a preferred specific formulation, expressed in percentage by weight, of a correction fluid that has been used successfully to render developed characters or portions thereof nonreadable by the machine:

EXAMPLE 4

Correction Fluid

| Percent Weight | Material |
|---|---|
| 10.0 | 85% phosphoric acid in water |
| 80.0 | Water |
| 9.0 | Solox of United States Industrial Chemicals, Inc. (denatured alcohol) |
| 1.0 | Triton X-100 of Rohm and Haas Co. (octyl-phenoxy polyethoxy ethanol) |
| 100.0 | |

The inks, developing solution and correction fluid herein disclosed are all non-toxic. Samples of the basic inked symbols and the distinctive characters chemically developed therefrom were tested in a "fadeometer" at 120° F., 50 percent relative humidity for 24 hours. Undeveloped symbols retained their reactivity when contacted with developing solution, and the developed characters did not fade.

Undesirable "tics" or extensions 14 of the kind illustrated in FIG. 4 are prevented by use of the patterns illustrated in FIGS. 2 and 3. In the pattern shown in FIG. 2, the dots 12 are printed at all corners of the respective subsquares and dashes 13 are printed between the dots as necessary to provide a square divided into four equal subsquares by dots and dashes slightly spaced from each other and all visible to the human eye. The spacing between all dots and the adjacent dashes is identical, leaving unprinted gaps in the pattern printed on the substrate. The length of the spaces is critical, and is selected by determining the maximum distance the dots and dashes can be separated without having visible breaks or discontinuities in the developed image.

In the modified symbol 11' shown highly magnified in FIG. 3, the hollow square and its four identical subsquares are defined by a halftone contact screen comprising a plurality of fine closely spaced dots 12' which when developed would appear to the eye and to the machine as continuous lines without discontinuities. The dots 12' must be sufficient in number and size to provide an image of an intensity and density capable of being optically scanned.

Actual tests demonstrated that the inks, developing solution and correction fluid herein disclosed produced the desired results.

Reflectance was measured by a DK–2 Spectrophotometer made by Beckman Instruments, Inc. used in a reflectance mode to generate plots of percent reflectance versus wavelength in millimicrons. All measurements of reflectance percentage were relative to the untreated substrate; i.e., the cardstock or paper without ink or developer represented 100 percent reflectance. The spectrophotometer device is accepted within the trade as accurate within ± 2 percent.

When the developing solution of Example 3 was applied to untreated (i.e., uninked) areas of 0.007 inch thick cardstock or 20-pound bond paper, reflectance measured substantially 95 percent throughout the preselected 850 to 950 mu wavelength band of the infrared range; this assures that a machine which is constructed to read within said band will not mistakenly "read" an uninked area when it is inadvertently smeared or coated with developing solution. Also the said developing solution when applied to areas of cardstock and paper printed with the respective inks herein disclosed will provide characters with a reflectance measured as varying from a maximum of 41 percent to as low as 26 percent throughout said preselected band (850 to 950 mu) of the infrared range, thus assuring that the developed portions of the character are both human readable and reliably machine recognizable. Since no images will occur within a wide reflectance range (i.e., essentially 95–41 percent), the optical character reading machine constructed to read within said band can desirably employ relatively inexpensive character recognition equipment since it does not have to discriminate between a "go" or "no-go" intensity in the 95- 41 percent reflectance range; i.e., the non-machine readable areas will have an almost perfect reflectance of at least 95 percent and the areas to be machine read will be intense enough to provide a reflectance of not more than 41 percent.

While applicants' inks and developing solution were especially developed for use with optical character readers designed to read in the 850–950 mu wavelength band of the infrared range, it is to be understood that they will operate satisfactorily in other preselected bands within the 700 to 950 mu portion of the infrared range. Tests disclosed that reflectance of the developed image, when the developing solution of Example 3 was applied to untreated areas of cardstock and paper, measured about 94 percent in the 700–850 mu range (a very slight drop); however, when applied to treated areas (i.e., over the inks), reflectance dropped significantly, desirably providing an even darker developed image. More specifically, the developer of Example 3 applied over the moisture-setting ink of Example 1 gave a reflectance measured as low as 16 percent at 700 mu and increasing to 26 percent at 850 mu; whereas said developer applied over the lithographic ink of Example 2 gave a reflectance measured as low as 21 percent at 700 mu and increasing to 31 percent at 850 mu. This desirably provides an even greater spread between the reflectance of the developer when applied to uninked areas as compared to inked areas, to assure that only developed portions of the inked constraint will be read as valid characters.

It will be apparent that other constraint configurations, and other commercially available solvents and reactants may be substituted for those specified in the foregoing examples without departing from the spirit, scope and teachings of the present invention. Accordingly, the examples are to be considered merely as illustrative, and the scope of the invention is to be limited only as specified in the claims.

What is claimed is:

1. As an article of manufacture, a document comprising a substrate overprinted with a plurality of identical symbols in an ink that is visible to the eye but not recognizable by an optical character reading machine,
each such symbol constituting a constraint pattern adapted to be chemically developed in selectable portions thereof by an operator-applied developing solution,
that portion of the inked pattern contacted by the solution reacting chemically to create a desired one of a plurality of possible hand printable, human readable, non-smearing, machine readable characters having a precisely defined machine recognizable configuration corresponding to the sharp lines of the overprinted constraint pattern where developed by said solution, and said solution when applied to any portions of the substrate not overprinted with said ink being ineffective to provide indicia of a color and intensity readable by the machine,
each of said symbols being in the form of a hollow figure divided into a plurality of hollow subfigures, said figure and subfigures being defined by discontinuous non-touching sections separated by dots which do not touch the sections or other dots, the dots being at least at each point of adjacency of one section with another, and printed in said ink with a spacing predetermined to be great enough to preclude the creation of undesired feathered edges or at intersections of a developed section with one not being developed without creating detectable discontinuities in the machine readable character as developed.

2. An article according to claim 1, wherein
the overprinted ink is adapted to produce the machine readable character by chemical reaction with a developing solution that comprises an iron salt dissolved in a polar solvent in the presence of halide and acetate ions, and
said ink comprises a phenol whose reaction product with iron salts is black, and said ink being substantially neutral to cause at least two protonic hydrogen ions to be removed from the phenol before application of the developing solution to the ink and generate highly reactive phenoxide ions with which the iron salts readily react upon application of said developing solution.

3. An article according to claim 2, wherein
the machine readable character formed as the reaction product of the developing solution with said ink is adapted to be eradicated and rendered non-machine readable by application of a correction fluid comprising a solution of phosphoric acid in water.

4. An article according to claim 2, wherein
said ink is a moisture-setting ink having a resin content with an acid number of the order of about 250 to 350 and containing a compound that when combined with the phenol renders the ink substantially neutral, and
said compound being an amine, a 1 percent solution of which in water would give a pH value of at least 9.

5. An article according to claim 4, wherein
the ratio, by weight, of phenol to amine is within the range of 2:1 and 5:1.

6. An article according to claim 2, wherein
said ink is a lithographic ink having a resin content with an acid number of the order of about 10 to 25 which does not substantially alter the essentially neutral nature of the ink.

7. An article according to claim 1, wherein
said symbols when undeveloped having a reflectance ratio relative to the substrate of substantially 95 percent or more in a preselected band within the infrared wavelength range and when developed having a reflectance ratio of substantially 40 percent or less within said band.

8. An article according to claim 7, wherein
portions of the substrate not overprinted with said ink provide a reflectance ratio relative to the substrate of substantially 95 percent or more within said preselected band when developing solution is inadvertently applied to such portion.

9. An article according to claim 2, wherein
said overprinted ink comprises, by weight, approximately 35 percent phenol compound, 43 percent of a moisture-set vehicle, 8 percent of an amine selected from the group consisting of tetradecyl amine and stearyl amine, 3 percent thickening agent, 5 percent hygroscopic solvent, 1 percent pigment, 3 percent lubricating grease, and 2 percent wetting agent.

10. An article according to claim 2, wherein
said overprinted ink comprises by weight, approximately 35 percent propyl gallate, 43 percent of a 60 percent resin in triethylene glycol, 8 percent of an amine selected from the group consisting of tetradecyl amine and stearyl amine, 3 percent alumina hydrate, 5 percent diethylene glycol, 1 percent pigment, 3 percent lubricating grease, and 2 percent sorbitan partial fatty ester.

11. An article according to claim 2, wherein
said overprinted ink comprises, by weight, approximately 40 percent phenol compound, 57 percent varnish, and 3 percent pigment.

12. An article according to claim 2, wherein
said overprinted ink comprises, by weight, approximately 35 to 40 percent of at least one phenolic compound selected from the group consisting of propyl gallate, trihydroxybutyrophenone, sodium salicylate in combination with 2,3 dihydroxynaphthalene-6-sulfonic acid, 2,4 dihydroxybenzophenone, sodium salt, and 8-hydroxyquinoline.

13. An article according to claim 2, wherein
the overprinted ink is adapted to produce such machine readable character by chemical reaction with a developing solution that comprises, by weight, approximately 20 percent ferric chloride hexahydrate, 4 percent ammonium acetate and 76 percent solvents selected from the group consisting of 1-butanol, diethylene glycol and tetraethylene glycol.

14. An article according to claim 13, wherein
the machine readable character formed as the reaction product of the developing solution with said ink is adapted to be eradicated and rendered non-machine readable by application of a correction fluid comprising, by weight, approximately 10 percent of an 85 percent solution of phosphoric acid in water, 80 percent water, 9 percent denatured alcohol, and 1 percent octylphenoxy polyethoxy ethanol.

15. The method of creating an optical character recognizing machine-readable document with precisely defined hand delineated machine readable characters, comprising the steps of
providing an ink that is visible to the human eye when applied to a substrate but not machine readable by an optical character reading machine, and is capable of providing a character of a color and intensity that is machine readable only where a developing solution is applied thereto,
printing the substrate with said ink to provide in one printing step a plurality of identical constraint character patterns from which a language of precisely defined machine recognizable characters may be formed, said patterns being formed of discontinuous non-touching segments separated by dots which do not touch the segments or other dots, the dots being at least at each point of adjacency of one segment with another, said segments and dots being visible to the human eye and with a predetermined spacing corresponding to the maximum that will provide, when developed, a machine readable character without detectable discontinuities, and
tracing over selectable portions of at least one pattern with the developing solution so as to develop such portions into a desired one of said characters.

16. The method according to claim 15, wherein
the ink comprises a phenol whose reaction product with iron salts is black, said ink being rendered substantially neutral to cause, prior to the tracing step, at least two protonic hydrogen ions to be removed from the phenol and generate highly reactive phenoxide ions, and
the developing solution comprises an iron salt dissolved in a polar solvent in the presence of halide and acetate ions.

* * * * *